United States Patent [19]

Paranjpe

[11] Patent Number: 4,544,930

[45] Date of Patent: Oct. 1, 1985

[54] INK JET PRINTER WITH SECONDARY, CYCLICALLY VARYING DEFLECTION FIELD

[75] Inventor: Suresh C. Paranjpe, Dayton, Ohio

[73] Assignee: The Mead Corporation, Dayton, Ohio

[21] Appl. No.: 612,110

[22] Filed: May 21, 1984

[51] Int. Cl.[4] .......... G01D 15/18

[52] U.S. Cl. .......... 346/75

[58] Field of Search .......... 346/1.1, 75

[56] References Cited

U.S. PATENT DOCUMENTS

| | | | |
|---|---|---|---|
| 3,500,436 | 3/1970 | Nordin | 346/75 |
| 3,701,998 | 10/1972 | Mathis | 346/75 |
| 3,739,395 | 6/1973 | King | 346/75 |
| 3,972,052 | 7/1976 | Atumi et al. | 346/75 |
| 4,010,477 | 3/1977 | Frey | 346/75 |
| 4,085,409 | 4/1978 | Paranjpe | 346/75 |
| 4,122,458 | 10/1978 | Paranjpe | 346/75 |
| 4,346,387 | 8/1982 | Hertz | 346/1.1 |

OTHER PUBLICATIONS

"Ink Jet Head" by Krause, *IBM Technical Disclosure Bulletin*, vol. 19, No. 8, Jan. 1977, pp. 3216, 3217.

*Primary Examiner*—E. A. Goldberg
*Assistant Examiner*—Gerald E. Preston
*Attorney, Agent, or Firm*—Biebel, French & Nauman

[57] ABSTRACT

An ink jet printer transporting a print receiving medium angularly past a print head which generates a row of jet drop streams. Drops in the streams are selectively charged to either a print charge level or a catch charge level, and are subsequentlysubjected to a cyclically varying electric deflection field, normal to the row, which deflects of the drops carrying the print charge level into selected print trajectories. A static electric deflection field then separates the drops into print and catch trajectories, with the drops in the catch trajectories being intercepted by a catcher and thereby prevented from striking the print receiving medium. Drops from each jet drop stream may be deflected in a direction perpendicular to the row by the secondary field so as to be deposited at a number of positions on the print receiving medium.

12 Claims, 7 Drawing Figures

INK JET PRINTER WITH SECONDARY, CYCLICALLY VARYING DEFLECTION FIELD

BACKGROUND OF THE INVENTION

The present invention relates to jet printing devices and, more particularly, to apparatus for controlling accurately the deposit of ink drops on a print receiving medium to produce collectively an image of high resolution.

Jet drop recorders, such as that shown in U.S. Pat. No. 3,701,998, issued Oct. 31, 1972, to Mathis, have included one or more rows of orifices which receive electrically conductive recording fluid, such as water base ink, from a pressurized fluid manifold and eject the fluid as parallel fluid filaments. Mechanical stimulation is applied to the structure or is fluid-coupled to the orifices, causing each of the filaments to disintegrate into a jet drop stream.

Graphic reproduction in recorders of this type is accomplished by selectively charging some of the drops in each of the streams. The drops then pass through an electric field which deflects the charged drops such that they strike a drop catching device. The uncharged drops, however, pass unaffected through the deflection field and are deposited on a moving web of paper or other material. The uncharged drops collectively form a print image on the web.

A problem with jet printers has been attaining sufficient image resolution. Since a discrete number of drops from the printed images, it is clear that an increase in the number of drops deposited per unit area of print medium, and a corresponding increase in data handling capability, permit improved image definition. If, however, each jet is used in a binary manner to deposit drops selectively at a single associated position on the print receiving medium, the number of drops per unit width and, therefore, the resolution of an image in the direction transverse to the print web, are limited by the minimum dimensions required between orifices. U.S. Pat. No. 4,010,477, issued Mar. 1, 1977, to Frey discloses a printer in which the effective density across the print receiving medium is increased by orienting rows of jets along angularly positioned placement lines. The Mathis '998 device increased the number of drops across the width of the medium by using multiple rows of jet drop streams which interlace. The printer disclosed in "Ink Jet Head," by Krause, *IBM Technical Disclosure Bulletin,* Vol. 19, No. 8, January 1977, pp. 3216 and 3217, combines these approaches by providing two interlaced rows of drop streams which are positioned obliquely with respect to the direction of web movement.

It will be appreciated, however, that increased resolution may be obtained by constructing the printer such that drops from each jet can be deflected selectively to any of a number of positions on the print receiving medium. U.S. Pat. No. 3,739,395, issued Jun. 12, 1973, to King discloses a printer in which uncharged drops are caught while the charged drops from each orifice are deflected by two sets of deflection electrodes to a plurality of discrete positions on the moving web. Deflection of the drops is either perpendicular or parallel to the direction of web movement, or both, covering either a one line matrix or a multiple line matrix across the web. The minimum distance between jet orifices is somewhat greater in the King device than in previously mentioned devices, however, since deflection electrodes must be positioned on all sides of each orifice.

U.S. Pat. No. 3,972,052, issued Jul. 27, 1976, to Atumi et al discloses an ink jet printing device in which a single jet scans a plurality of print lines in succession under control of two pairs of deflection electrodes. The electrodes provide parallel deflection fields through which the ink drops pass in succession, with identical ramp deflection voltages being applied to the deflection electrodes. The deflection voltage applied to the second pair of deflection electrodes is delayed with respect to the deflection voltage applied to the first pair so that the same linearly increasing field is experienced by each drop between both pairs of electrodes.

The difficulties encountered with structures in which deflection electrodes are positioned intermediate adjacent jet drop streams have been eliminated by providing a print head which generates a plurality of jet drop streams positioned along a row which is inclined with respect to the direction of web movement, and in which deflection of the drops in the streams to various print positions is accomplished by a deflection field or fields perpendicular to the row or rows of streams. Such arrangements are shown in U.S. Pat. No. 4,085,409, issued Apr. 18, 1978, to Paranjpe and U.S. Pat. No. 4,122,458, issued Oct. 24, 1978, to Paranjpe. In the Paranjpe '409 device, drops are selectively charged to differing print charge levels such that the degree of deflection which they experience as they pass through the deflection field varies correspondingly. In the Paranjpe '458 patent, a printer is disclosed in which the trajectories of the drops are controlled by varying, non-cyclical electric deflection fields. The fields are altered in dependence upon the amount of deflection dictated by the print controlled data.

It can be seen, therefore, that in the Paranjpe '409 and Paranjpe '458 patents, the printers require either charging of drops to multiple discrete levels or non-cyclical high speed of the fluctuation deflection field. Large swings in field intensity are not easily accomplished in short periods of time due to the capacitive nature of the deflection electrodes. Additionally, it will be appreciated that providing a plurality of discrete deflection electrodes for each jet drop stream may result in substantial cross talk between the deflection field controlling adjacent jets. High speed fluctuation in charge potential levels, on the other hand, where many such levels are used, as in the Paranjpe '409 device, is complex and requires substantial control circuitry.

It is seen, therefore, that there is a need for a simple printer capable of high speed printing with a large number of ink drops so as to increase image definition.

SUMMARY OF THE INVENTION

An ink jet printer according to the present invention includes means for transporting a print receiving medium past a print station, a print head means for generating a row of jet drop streams directed at the medium at the station, the row being inclined with respect to the direction of movement of the medium, and charging means for selectively charging drops in the streams such that selected ones of the drops carry a print charge level and others of the drops carry a catch charge level. The printer further includes means for generating a cyclically varying electric deflection field, normal to the row of jet drop streams, for deflecting drops carrying the print charge level into selected print trajectories, a means for generating a static electric deflecting field for separating the drops into print and catch trajectories, and catcher means, positioned to intercept drops in the catch trajectories and prevent the intercepted drops from striking the print receiving medium.

The charging means may include means for inducing a non-zero print charge level. The charging means may further include means for inducing a non-zero catch charge level which differs substantially from the non-zero print charge level. Alternatively, the charging means may include means for providing a zero catch charge level.

The means for generating a cyclically varying electrical deflection field may include means for subjecting only one print drop in each stream to the cyclically varying electrical deflection field at any given time. The means for generating a cyclically varying electrical deflection field may further include shielding means for limiting the field.

The ink jet printer utilizing a non-zero catch charge level may have the catcher positioned to one side of the row of jet drop streams and extending parallel to the row. The means for generating a cyclically varying field may include deflection electrodes and means for applying a cyclically varying electrical potential to the deflection electrodes. The field may be varied in a stepwise manner.

Accordingly, it is an object of the present invention to provide an ink jet printer in which drops are given a first, non-zero charge level when they are to be deposited on the print receiving medium and in which they are given a second charge level when they are to be caught and in which drops from each jet drop stream may be deposited at a plurality of print positions on the medium; to provide such an ink jet printer in which a static primary deflection field separates the drops into print trajectories and catch trajectories in dependence upon the charge level which they carry and in which a cyclically varying secondary field, extending parallel to the primary deflection field, separates the drops having the first non-zero charge level into varying trajectories in dependence upon the strength of the secondary field at the time that the drops pass therethrough; to provide such a printer in which a plurality of jet drop streams are arranged in a row, generally inclined with respect to the direction of movement of the print receiving medium, and the deflection of drops by the fields occurs in a direction substantially normal to the row; and to provide such a printer in which the fields extend perpendicular to the row of jet drop streams.

Other objects and advantages of the invention will be apparent from the following description, the accompanying drawings and the appended claims.

DETAILED DESCRIPTION OF THE PREFERRED EMBODIMENT

Figure 1:
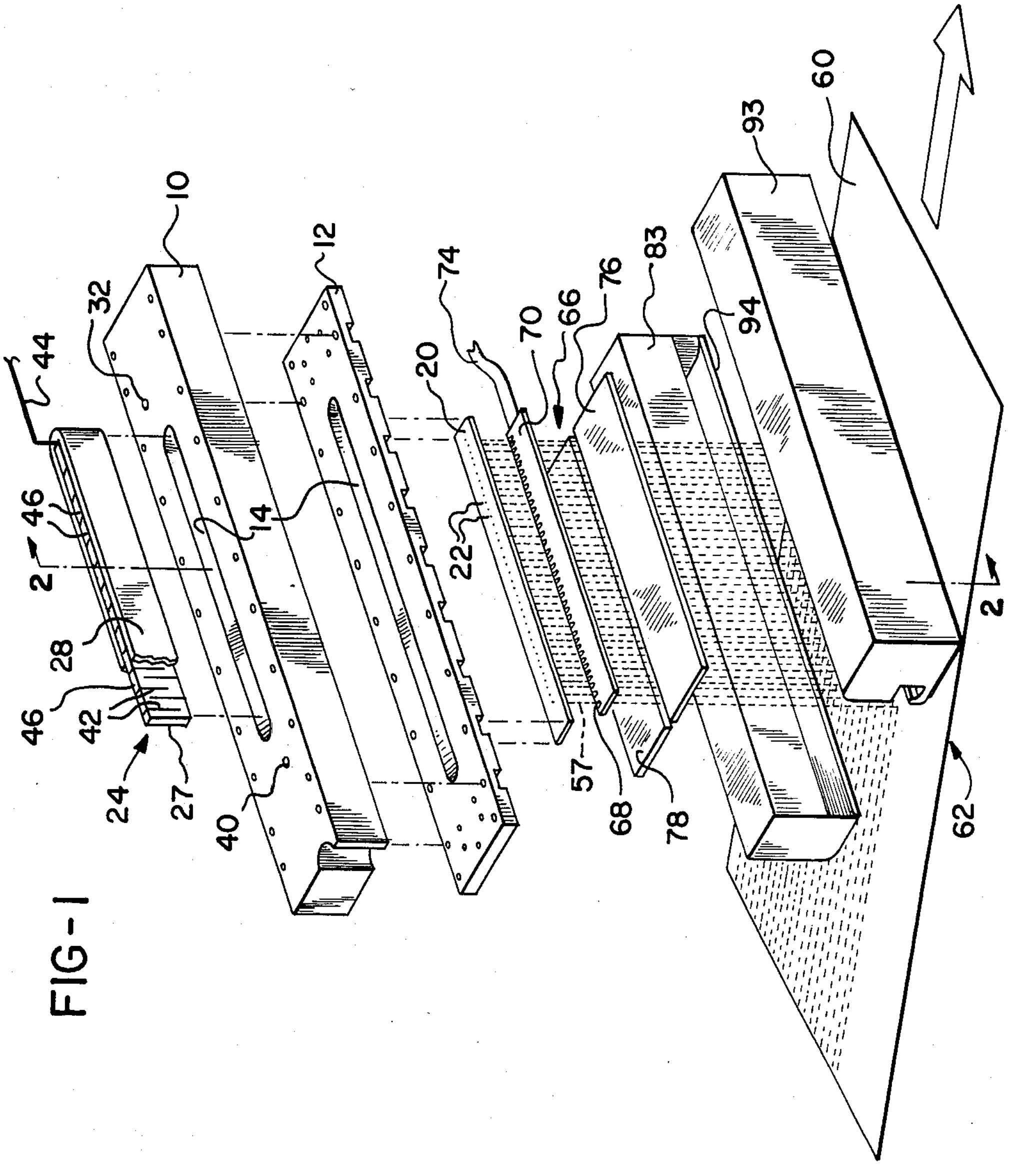
FIG. 1 is an exploded perspective view, illustrating the ink jet printer of the present invention.
Figure 2:
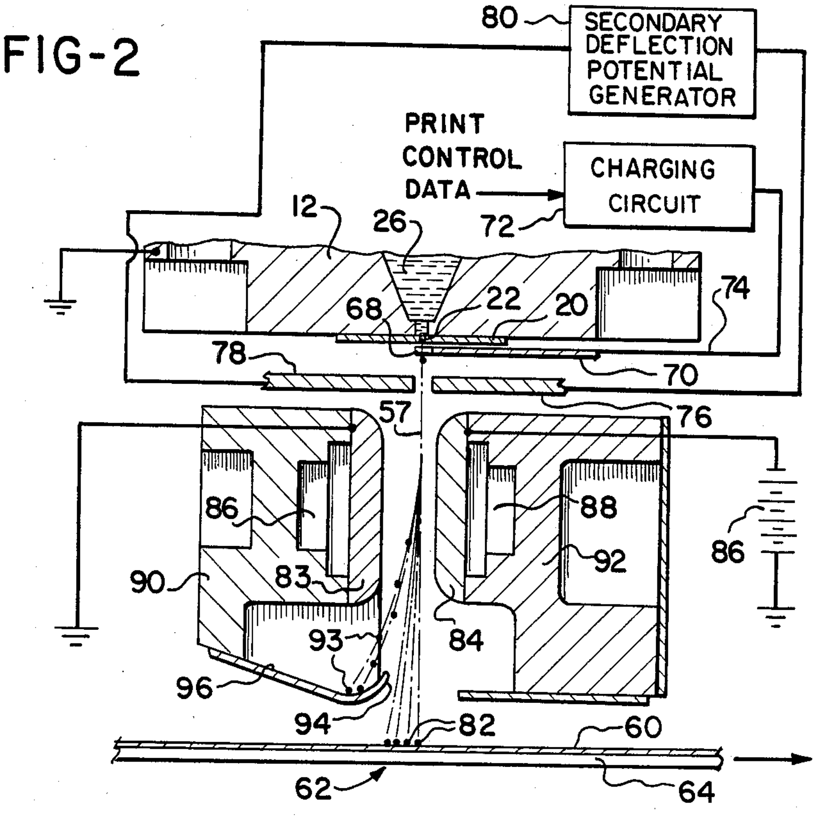
FIG. 2 is a sectional view, taken generally along line 2—2 in FIG. 1, with the upper portion of the print head broken away.
Figure 3:
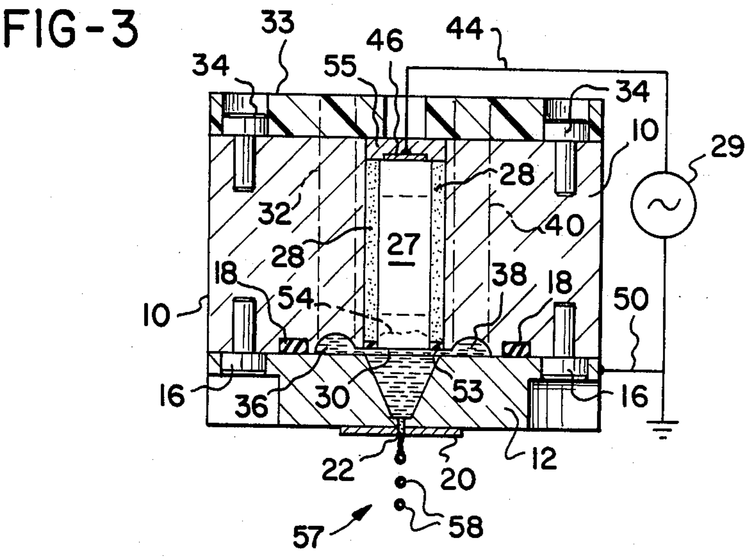
FIG. 3 is a complete sectional view of the print head, taken generally along the line 2—2 in FIG. 1.

The present invention relates to ink jet printers and, more particularly, to an improved arrangement for selectively depositing drops from each of a number of jet drop streams at a plurality of print position on a moving, print receiving medium. As seen in FIGS. 1–3, the fluid jet print head has a manifold means, including upper manifold portion 10 and lower manifold portion 12, which defines an elongated cavity 14 therein. Manifold portions 10 and 12 are held together by bolts 16, compressing a sealing ring 18 therebetween.

The print head further includes an orifice plate 20 which defines a plurality of orifices 22 arranged in at least one relatively long row. Orifice plate 20 is mounted on the bottom of manifold portion 12 by an adhesive or, alternatively, by soldering or other appropriate means. The orifices 22 communicate with cavity 14 and the row of orifices extends generally parallel to the direction of elongation of the cavity 14.

A stimulator 24 is mounted in cavity 14 and, as shown in FIG. 3, is spaced from the orifice plate 20 so as to define a fluid reservoir 26. The stimulator 24 includes a plurality of piezoelectric means defined by elongated transducer 27. The piezoelectric means lengthen and contract vertically when electrically excited with an oscillating signal. The stimulator further includes acoustic isolation material 28 which surrounds the piezoelectric means and provides a means of supporting the piezoelectric means in the cavity 14.

The oscillatory movement of the bottom surfaces of the piezoelectric means produces pressure waves of substantially uniform phase front in the fluid in the reservoir 26. These waves travel downward through the fluid and are coupled to the field filaments flowing through the orifices 22, causing them to break up into jet drop streams. An oscillating excitation signal is produced by an electrical signal generator 29 and this is applied to the transducer 27 to produce this oscillatory movement.

Fluid is supplied to the reservoir 26 by a fluid supply inlet 32 which extends downward through upper manifold portion 10 and a support plate 33, attached to manifold portion 10 by bolts 34. Inlet 32 terminates in a channel 36 which extends substantially the entire length of the reservoir 26. A similar channel 38 communicates with the reservoir 26 and a fluid outlet 40, providing a means of removing fluid from the print head during cross flushing at shutdown. The transducer 27 defines a plurality of slots 42, as seen in FIG. 1, which extend alternately from opposite sides of the transducer partially therethrough so as to define the plurality of piezoelectric means. The slots 42 reduce substantially the possibility of wave movement or bending along the length of the transducer 27.

Figure 5:
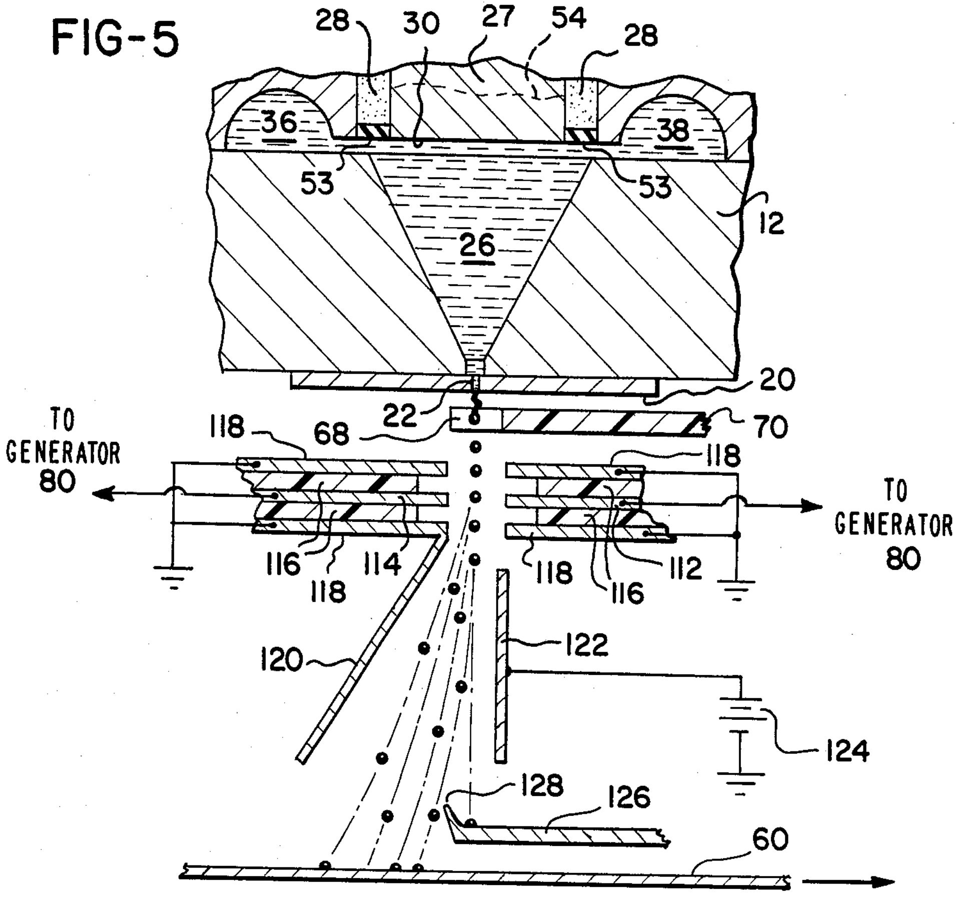
FIG. 5 is an enlarged sectional view, similar to FIG. 3, of the lower portion of the print head and a modified secondary deflection electrode arrangement.

The electrical signal generator 29 is coupled by means of a conductor 44 to a plurality of electrodes 46 on the top surfaces of the transducer 27, with the electrodes 46 being connected in parallel by means of conductors (not shown) which bridge the slots 42. A conductor 50 connects generator 29 to conductive fluid in the reservoir 26 via electrically conductive manifold portion 12. The fluid contacts the surfaces 30 (FIG. 5)

on the bottom of the transducer and effectively acts as a second set of electrodes, opposing electrodes 46. The acoustical isolation material, of low density, surrounds the transducer 27 and effectively isolates it from manifold portion 10. The material 28 pots the transducer into position in the cavity 14. A room temperature vulcanized silicone 53 extends across and into slots 42, as indicated at 54, as well as covering isolation material 28. This seals the ink in reservoir 26. A layer of epoxy 55 may be provided in cavity 14 as a backing material for the stimulator. The print head means produces a plurality of jet drop streams when ink is supplied to the reservoir 26 under pressure and the stimulator arrangement produces break up of the streams 57 into drops 58.

A print receiving medium, such as a sheet of paper 60, is transported past a print station, indicated generally at 62, by means of a transport, such as belt conveyor 64. The jet drop streams are arranged in a row 66 which is inclined with respect to the direction of movement of the medium 60.

As is known, the drops 58 may be electrically charged by means of U-shaped charge electrodes 68 partially surrounding the tips of the fluid filaments which emerge from the orifices 22. The charge electrodes 68 provide a means for selectively charging drops in the streams 57 such that selected ones of the drops carry a print charge level and the remainder of the drops carry a catch charge level. The charge level carried by a drop is controlled by applying a charge potential to the electrode associated with the fluid filament from which the drop is formed. Induced in the tip of the fluid filament is a charge of opposite polarity and proportional in magnitude to the electrical potential placed on the charge electrode. As the drop is formed from the tip of the fluid filament, the drop carries away this induced charge.

Figure 7:
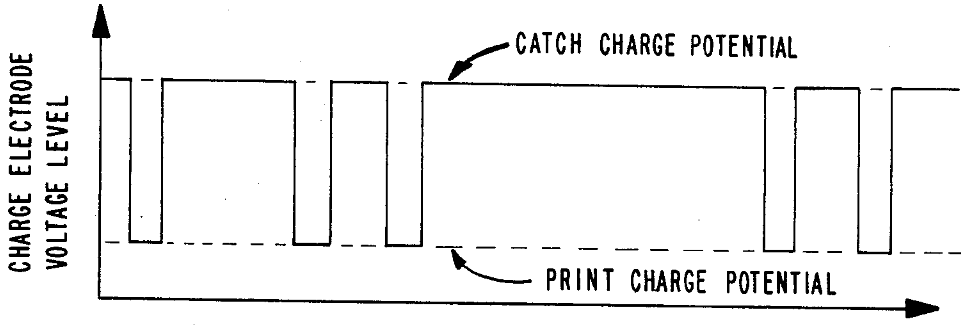
FIG. 7 illustrates fluctuation of the charge electrode voltage on a single electrode.

The charge electrodes 68 are defined by electrically conductive material lining notches in charge electrode plate 70. Electrical conductors (not shown), plated on the surface of the electrically non-conductive charge electrode plate 70, provide a means of supplying electrical charge potentials to the various charge electrodes 68 in a controlled, selective manner. The charge potentials are generated by charging circuit 72 (FIG. 2) and are supplied to the conductors on plate 70 by means of electrically conductive cable 74. The individual charge electrodes receive voltage signals which fluctuate selectively between a relatively high catch charge potential and a relatively low print charge potential, as shown in FIG. 7, based upon whether the drop then being formed is to be deposited on the print receiving medium. As may be noted in FIG. 7, the charge electrode catch and print potentials are both non-zero, such that all drops will carry some electric charge. As described more fully below in conjuction with FIG. 5, however, the drops which are to be caught may, in other embodiment of the invention, carry a zero charge level.

Figure 4:
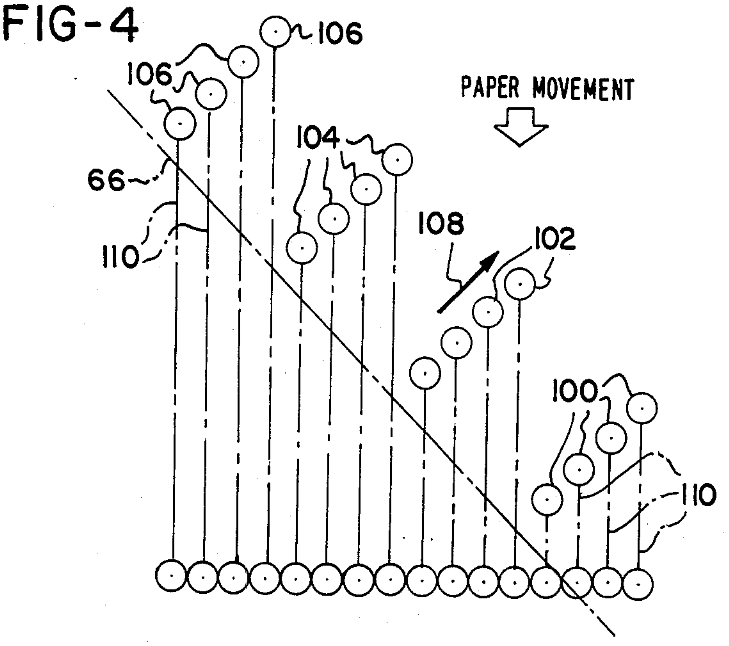
FIG. 4 is a schematic view of a portion of the print receiving medium, as seen from above, illustrating the positions at which drops are deposited by the jet drop streams.
Figure 6:
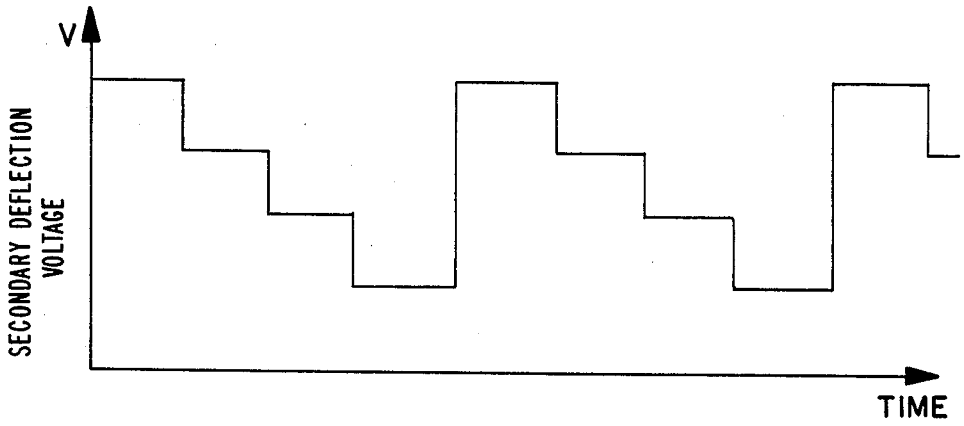
FIG. 6 illustrates a cyclically varying secondary deflection potential voltage.

The printer further includes secondary deflection electrode plates 76 and 78 which, in combination with secondary deflection potential generator 80, provide a means for generating a cyclically varying electrical deflection field which is normal to the row of jet drop streams and which deflects drops carrying the print charge level into selected print trajectories. As illustrated in FIG. 6, the voltage differential placed across deflection plates 76 and 78 is cyclically varied by generator 80 in a stepwise fashion. As a consequence, the field extending between plates 76 and 78 is varied in a manner which, although not precisely stepwise due to the capacitive nature of the deflection electrode structure, nevertheless approximates this stepwise variation. The drops carrying a print charge level, therefore, are deflected by varying amounts in dependence upon the field strength at the time that they pass between the plates. This deflection results in the drops striking the print receiving medium 60 at corresponding print positions 82. It will be appreciated, of course, that drops carrying the larger catch charge level will also be deflected by the field between plates 76 and 78. Due to the fact that these drops are subsequently caught, this deflection is of no importance. It will be further appreciated that the voltage differential between plates 76 and 78 could be varied in a manner approximating a ramp function. The drops would be subjected to a linearly varying field such that the average field strength experienced by successive drops would differ and a pattern of print positions as shown in FIG. 4 would be produced.

The printer includes a means for generating a static electric deflection field for separating the drops into print and catch trajectories, including porous metal electrodes 83 and 84, and voltage source 86. Electrodes 83 and 84 are positioned on opposite sides of row 66 and extend generally parallel thereto. Electrodes 83 and 84 cover vacuum chambers 86 and 88 defined by members 90 and 92, respectively. A partial vacuum is applied to chambers 86 and 88 such that drops which strike electrodes 83 and 84 are ingested into the chambers 86 and 88, and subsequently carried away. Due to the fact that the drops 93 which are to be caught carry a higher charge level than the print drops, drops 93 are deflected by the field between plates 83 and 84 to a substantial degree. This static deflection field is of a higher intensity than the field between plates 76 and 78 and, further, drops are subjected to the static field for a much greater period of time. As a consequence, the drops 93 are deflected sufficiently so as to be intercepted by the lip 94 of catcher 96.

The catcher 96 extends generally parallel to row 66, and is positioned to intercept drops in the catch trajectories and prevent the intercepted drops from striking the print receiving medium 60. Drops which strike catcher 96 are carried away by an appropriate liquid suction arrangement and may be collected and returned to the print head 12 for reuse.

The present invention operates by selectively charging drops in the jet drop streams 57 in a binary fashion, i.e. a relatively low charge level being induced on drops which are to be printed on the medium 60, and a relatively high charge level being induced upon drops 93 which are to be caught by catcher 96. The drops which are to be printed are then deflected into four different print trajectories by a cyclically varying secondary deflection field which is impressed between plates 76 and 78 and which produces varying amounts of deflection in accordance with the level of the field as successive print drops pass through it. A somewhat greater deflection of the print drops occurs as they pass between deflection electrodes 83 and 84, and are subjected to a higher intensity static electric deflection field. This deflection, however, is not sufficient to cause the print drops to be deflected to catcher 96. The deflection field is, however, sufficient to deflect the more highly charged drops 93 to the catcher 96.

As noted previously, the row of jets 66 is skewed with respect to the direction of paper movement, as illustrated in FIGS. 1 and 4. Note that the points 100 on the print receiving medium, as seen from above, denote print positions where drops are deposited from a single jet. Similarly, print positions 102 are serviced by a single jet, print positions 104 are serviced by a single jet, and print positions 106 are serviced by a single jet. Deflection of the drops is accomplished by both the primary and the secondary deflection fields in a direction, indicated by arrow 108, which is substantially perpendicular to the row of jets 66. By this technique, drops may be deposited along print lines 110 as the print receiving medium is transported past the print station 62. Collectively, therefore, the deposited drops define a print image on the paper.

Reference is now made to FIG. 5, which illustrates a further embodiment of the invention. The print head and charge electrode plate for this embodiment are substantially the same as that described with respect to the embodiment of FIG. 1. It should be noted, however, that a modified secondary deflection electrode structure is provided. This structure includes electrode plates 112 and 114 which correspond generally to plate 76 and 78, and which are electrically connected to a secondary deflection potential generator, such as generator 80 in FIG. 2. The plates 112 and 144 are sandwiched between insulator plates 116 and this structure, in turn, is sandwiched between grounded shield plates 118. Plates 118 have the effect of confining the secondary deflection field to the immediate region of plates 112 and 114 and thereby prevent the secondary deflection field from inadvertently affecting charging of the drops by electrodes 68 or deflection of the drops by the static, primary deflection field. After passing through the cyclically varying secondary deflection field, the drops emerge and pass through the primary field which is defined between grounded plate 120, an extension of a shield layer 118, and deflection electrode 122. Electrode 122 receives a deflection potential from voltage source 124.

In this embodiment, drops which are to be caught are not charged and, therefore, pass unaffected through both the primary and secondary deflection fields, striking catcher 126 which is positioned directly in the path of the undeflected jet drop streams.

Catcher 126 defines a lip 128 which extends along the row of jet drop streams, generally parallel to the row. Drops which are to be printed on the print receiving medium 60 are deflected initially by the field between plates 112 and 114 into a number of differing print trajectories. All of these drops are subsequently shifted in trajectory by the field between electrodes 120 and 122 to a degree that they do not strike the catcher 126 and are therefore deposited on the print receiving medium. Note that while the drops which are to be caught in the embodiment of FIG. 5 carry no electric charge, print drops, like those produced in the embodiment of FIG. 1, all carry a non-zero charge level which permits the drops to be deflected to various print positions on the medium 60 by the cyclically varying secondary deflection field.

It may be desirable with either embodiment to interpose guard drops between successive print drops produced by the print head. A guard drop is simply a drop which is charged to a catch charge level, regardless of the image to be printed. Guard drops serve the function of physically separating the drops which may be selectively deposited on the print receiving medium. By inserting one or more guard drops between each successive print drop, the print drops are spaced apart sufficiently to insure that the secondary deflection field acts only on one print drop in each jet drop stream at any given time. Guard drops also function to reduce the electrostatic and aerodynamic effects which drops within a stream would otherwise have on each other.

It may be appreciated that although binary charging is utilized in the described embodiments, other charging techniques could be utilized. For instance, two charge levels could be selectively induced on drops which are to be printed on the medium, with a third, higher charge level being induced on drops which are to be caught by the catcher. With this technique, fewer steps in the secondary deflection voltage are required to service the same number of print positions.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An ink jet printer for printing on a moving print-receiving medium, comprising:

print head means for producing a plurality of jet drop streams directed at said medium, said streams being arranged in a row which is oblique with respect to the direction of movement of said medium, charging means for selectively inducing a first, non-zero charge level on drops which are to be deposited on said medium and for inducing a second charge level on drops which are not to be deposited on said medium, means for providing a static primary deflection field extending parallel to said medium and perpendicular to said row and positioned in the paths of said streams, said primary deflection field separating said drops into print trajectories and catch trajectories in dependence upon whether said drops carry said first or second charge levels, respectively, catcher means, extending parallel to said row of jet drop streams and positioned generally between said print head means and said medium, for catching drops in said catch trajectories, and means for providing a cyclically varying secondary deflection field extending parallel to said primary deflection field and positioned in the path of said streams, said secondary deflection field separating drops having said first non-zero charge level into varying trajectories in dependence upon the strength of the secondary deflection field at the time that the drops pass therethrough, whereby the drops from each jet drop stream may be deflected into at least two print trajectories for deposit at two positions on the print receiving medium.

2. An ink jet printer according to claim 1, in which said charging means includes means for periodically charging drops to a guard charge level, whereby each jet drop stream includes one or more guard drops between successive print drops.

3. An ink jet printer, comprising means for transporting a print receiving medium past a print station, print head means for generating a row of jet drop streams directed at said medium at said station, said row being inclined with respect to the direction of movement of said medium, charging means for selectively charging drops in said streams such that selected ones of said drops carry a print charge level and others of said drops carry a catch charge level, means for generating a cyclically varying electric deflection field, normal to said row, for deflecting drops carrying said print charge level into selected print trajectories, means for generating a static electric deflection field normal to said row for separating the drops into print and catch trajectories, and a catcher positioned to intercept drops in said catch trajectories and prevent the intercepted drops from striking said print receiving medium.

4. The printer of claim 3 in which said charging means includes means for inducing a non-zero print charge level.

5. The ink jet printer of claim 4 in which said charging means further includes means for inducing a non-zero catch charge level which differs substantially from said non-zero print charge level.

6. The ink jet printer of claim 4 in which said charging means further includes means for inducing a zero catch charge level.

7. The ink jet printer of claim 4 further comprising means for subjecting only one print drop in each stream to said cyclically varying electrical deflection field at any given time.

8. The ink jet printer of claim 7 in which said means for generating a cyclically varying electrical deflection field further includes shielding means for limiting said field.

9. The ink jet printer of claim 4 in which said catcher is positioned to one side of said row of jet drop streams and extends parallel to said row.

10. The ink jet printer of claim 9 in which said cyclically varying field extends between a pair of secondary deflection electrodes positioned on opposite sides of the row of jets between said charging means and said means for generating a static electric deflection field.

11. The ink jet printer of claim 10 in which said means for generating a cyclically varying field includes means for applying a cyclically varying electrical potential to said secondary deflection electrodes.

12. The ink jet printer of claim 3 in which said cyclically varying electric deflection field varies in a stepwise manner.

* * * * *